United States Patent

[11] 3,599,183

[72] Inventor Ingo Groeger
Munich, Germany
[21] Appl. No. 870,038
[22] Filed Oct. 28, 1969
[45] Patented Aug. 10, 1971
[73] Assignee Siemens Aktiengesellschaft
Berlin and Munich, Germany
[32] Priority Dec. 5, 1968
[33] Germany
[31] P 18 12 963.0

[54] FIXED VALUE STORER
4 Claims, 3 Drawing Figs.

[52] U.S. Cl. ............. 340/173 R, 340/173 SP
[51] Int. Cl. ............. G11c 13/00, G11c 17/00
[50] Field of Search ............. 340/173, 173 SP

[56] References Cited
UNITED STATES PATENTS
3,383,663 5/1968 David ............. 340/173
3,392,376 7/1968 Olsson ............. 340/173

*Primary Examiner*—Terrell W. Fears
*Attorney*—Hill, Sherman, Meroni, Gross & Simpson

ABSTRACT: A fixed value storer, for binary values, employing resistance coupling between intersecting word and read lines, in which only a single conductor is provided for each word line and a pair of conductors for each read line, and in the storage of one binary value resistance coupling is provided between a word conductor and one of the conductors of a read line, and in the storage of the other binary value resistance coupling is provided between a word conductor and the other conductor of a read line, in which the read signals may be derived from voltage difference forming means connected with the read conductors of a read line to produce a bipolar read signal, the polarity of which is dependent upon the binary values to be read out.

INVENTOR
*Ingo Groeger*

BY *Hill, Sherman, Meroni, Gross & Simpson* ATTYS.

INVENTOR
Ingo Groeger

BY Hill, Sherman, Meroni, Gross & Simpson
ATTYS.

FIXED VALUE STORER

BACKGROUND OF THE INVENTION

The invention relates to a fixed value storer employing resistance coupling between intersecting word and read lines to determine the stored value thereat.

Fixed value storers of this type are known, in which the stored value is determined by the provision or absence of a coupling resistance at the storage point involved (see for example Steinbuch, "Vest Pocket Manual of Data Processing," 1967, page 567).

In the known storers of this type, each word line comprises a single conductor and each reading line comprises a single conductor with the presence of a coupling resistance at an intersection of a word and read conductor being determined by the binary value to be stored. Thus if one value is to be stored a coupling resistance is provided and if the other value is to be stored the coupling resistance is omitted. In such an arrangement the read out signals are unipolar, one binary value being represented by a relatively low voltage and the other binary value by a relatively high voltage. However, the read current not only flows through the intended read conductor but, as a result of the connection of other coupling resistances between word and read lines not directly involved, as well as stray capacitances, the voltages differential or spread between that representing one binary value and that representing the other binary value may become so small that evaluation of the read out signals is greatly impaired, if not rendered impossible.

BRIEF SUMMARY OF THE INVENTION

The present invention thus is directed to the problem of producing a fixed value storer, employing resistance coupling, wherein the interference differential between different stored values is greater than in known type of storers.

The problem is solved by utilizing a single conductor for each word line and a pair of conductors for each read line with the binary value to be stored determining which read conductor of a pair is to be connected to be resistance coupling to the word line involved. Thus if one binary value is to be stored the resistance coupling is provided between the word conductor and the first conductor of a pair forming the read line, while if the other binary value is to be stored the resistance coupling is provided between the word conductor and the second conductor of the read line.

The pair of conductors of a read line can be connected to the inputs of difference forming means, as for example a differential amplifier, whereby interferences caused by stray capacities and the like may be materially reduced if not eliminated. In such an arrangement the output signal of such means is in the form of bipolar signals, the polarity of which is dependent upon the binary value being read out and it will be apparent that the voltage differential or spread between the bipolar signals is greater than that of the known storers by a factor of two.

BRIEF DESCRIPTION OF DRAWINGS

Other objects, features and advantages of the invention will be readily apparent from the following description of a preferred embodiment thereof, taken in conjunction with the accompanying drawing wherein like reference characters indicate like or corresponding parts, although variations and modifications may be effected without departing from the spirit and scope of the novel concepts of the disclosure and in which.

DETAILED DESCRIPTION OF THE INVENTION

Figure 1:
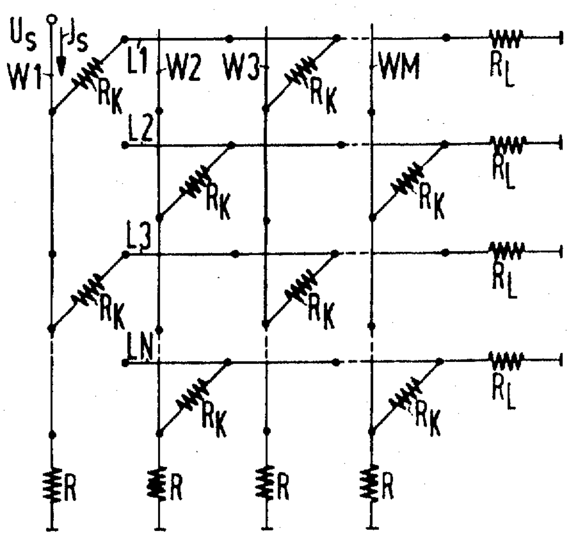
FIG. 1 schematically illustrates a portion of a fixed value storer of known type.

FIG. 1 illustrates a fixed value storer in accordance with the teaching of prior art, in which the word lines each comprise a single conductor, respectively identified as W1—WM, and in like manner the read lines each comprise a single conductor identified as L1—LN. Each of the word conductors W1-WM may be connected over a resistance R to a fixed potential and each of the read conductors L1—LN is terminated by an output resistance RL. The read voltage appears across the latter resistance and may be supplied to an evaluation circuit. Storage of information, such as binary values is achieved by inserting between the pertinent word and read conductors a coupling resistance RK or by omitting such a coupling resistance. Thus if a binary value, for example a logical "1" is to be stored, the pertinent word conductor is connected with the read conductor involved by a resistance RK, and if the other binary value is to be stored, for example a logical "0," no coupling resistance is connected at the intersection of the word and read conductors involved whereby an absence of connection exists at such point. Obviously, the presence or absence of a coupling resistance may be reversed with respect to the binary values involved.

To read the stored value at an intersection of a word conductor and a read conductor, a voltage US is applied to the word conductor (word conductor W1 in FIG. 1). As a result a current IS flows through such word conductor and at each intersection provided with a coupling resistance between such word conductor and a read conductor, part of the current IS branches to the corresponding read conductor which current flows over the terminating resistance RL, as a result of which a voltage there appears which can be evaluated as a read voltage. Assuming that in the storage of a logical "1" a resistance coupling exists between the word and read conductors and in the storage of a logical "0" no resistance coupling exists between the word and read conductors, a relatively high voltage will be produced at the resistance RL when reading a logical "1," while a relatively low voltage will be produced when reading a logical "0." Both read signals are unipolar and when a logical "0" is read, interference currents flow across the resistance RL as a result of current flow over other read and word conductors across coupling resistances RK to the particular read conductor involved. The differential or spread between a "1" signal and a "0" signal (interference spread) thus depends to a great deal upon the distribution of the information in the storer matrix. Under the most unfavorable conditions the interference spread may become so small that an evaluation of the read signals is no longer possible. In addition to this serious disadvantage, known fixed value storers also possess the disadvantages that the control current IS depends on the distribution of the storer information and stray capacities additionally reduce the interference spread of the read signals and thereby impairs the access time.

Figure 2:
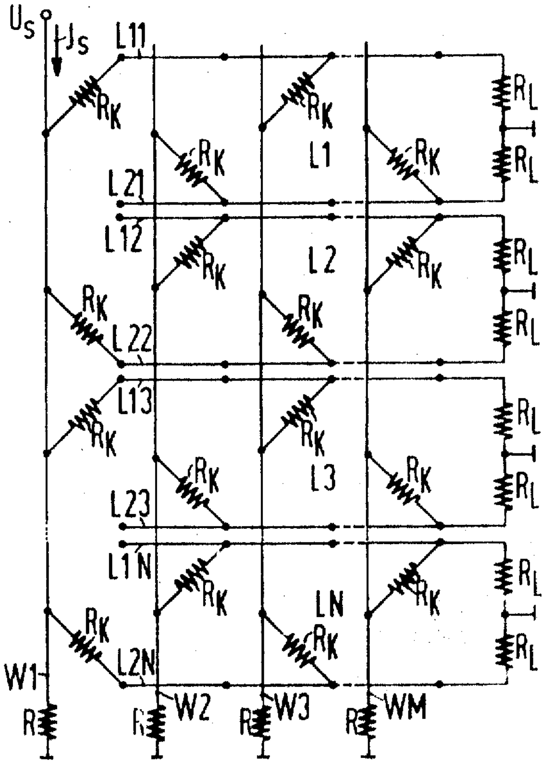
FIG. 2 schematically illustrates a portion of a fixed value storer constructed in accordance with the present invention.

In the fixed value storer illustrated in FIG. 2, constructed in accordance with the present invention, the word and read lines are identified in the same manner as in FIG. 1, the word conductors W1—WM each comprising a singe conductor connectable at one end at a fixed potential $U_s$ and terminated at the opposite end by a resistance R. In this construction each read line comprises a pair of read conductors. For example, the read line L1 comprises conductors L11 and L21, and in like manner the read line L2 comprises conductors L12 and L22 and the read line LN read conductors L1N and L2N. Each conductor of a pair is terminated at one end by a terminating resistance RL at which a read voltage appears.

Storage of one binary value, for example a logical "1" may be accomplished by inserting a coupling resistance RK between a word conductor and the first conductor of a conductor pair, for example be between the conductor W1 and the conductor L11. Storage of the other binary value, for example a logical "0" may then be accomplished by inserting a coupling resistance RK between the word conductor involved and the second conductor of the conductor pair, for example between the word conductor W2 and the read conductor L21.

Obviously the binary values may be reversed with respect to the read conductor to designate a "1" or "0."".

In reading out a fixed value storer constructed in accordance with the present invention, a control voltage is applied to the selected word conductor (word conductor W1 in FIG. 2), whereby a read out current IS flows over associated coupling resistances RK to individual conductors of the respective conductor pairs forming the associated read out lines. Thus, if a logical "1" is stored at an intersection between the selected word and associated read conductors, part of the current flows over the associated coupling resistance RK to the first conductor of the conductor pair, for example to L11 in FIG. 2. On the other hand if a logical "0" is stored, part of the current IS flows to the second conductor of such conductor pair, for example to L22 of FIG. 2. The read voltage to be supplied to an evaluation circuit appears at the terminating resistances RL with the read voltages of each conductor pair, for example conductors L11 and L21, being supplied to the inputs of difference-forming means for example a differential amplifier, whereby the difference of the read voltages appearing on the pair of conductors comprising a read line is formed. If a "1" is read, the difference is positive while if a "0" is read, the difference is negative. The read signals appearing at the output of the difference-forming means for the respective values "1" and "0" thus are bipolar whereby the interference spread between a "0" signal and a "1" signal in a fixed value storer in accordance with the invention is larger in comparison with that of known fixed value storers by approximately the factor two, assuming that the storage matrixes are of identical size.

The values of the read voltages and the differences of such voltages can be varied in case of predetermined word values M and bit values N by suitable selection of the operating voltage US and the dimensioning of resistances RK, Rl and R. Likewise the maximum read out current, with predetermined values of M and N, also depends on the voltage US and value of resistances RK, RL and R. Dependence of the current IS on the information stored, however, is negligibly small in a fixed value storer constructed in accordance with the invention.

Figure 3:
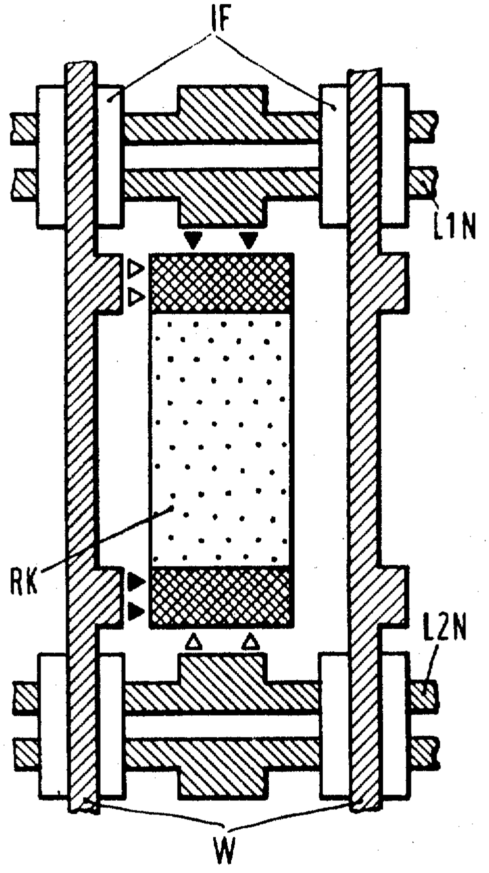
FIG. 3 illustrates an arrangement of a coupling resistance and associated word and read lines, constructed in accordance with the invention.

FIG. 3 illustrates a preferred practical construction of a fixed value storer in accordance with the present invention. The word and read conductors are disposed on a nonconductive base plate to form an orthogonally intersecting conductor network. In the embodiment illustrated the read conductors L1N and L2N of a read line are disposed throughout their length on the nonconductive base plate while the word conductors W overlie the read conductors at their intersections and are insulated therefrom by respective areas IF of insulating material disposed at the respective points of intersection. A coupling resistance RK is disposed in each area defined by the respective word and read conductors.

If a logical "1" is to be stored, the word conductor W and the conductor L1N are connected to the coupling resistance RK at the points indicated by the black arrowhead, and if a logical "0" is to be stored, the word conductor W and the conductor L2N are connected to the coupling resistance RK as indicated by the outlined arrowheads.

Such a fixed value storer can be produced by any suitable means, as for example, utilization of a screen printing method or an etching and vaporizing method. Where screen printing is employed, all coupling resistances RK are printed on a suitable insulator member following which the horizontal conductors, the insulation areas IF at the conductor intersections and the vertical conductors are consecutively printed. The respective conductors may be provided at the corresponding points with connecting terminals at which the associated resistance may be connected with the desired word and read conductors in dependence upon the information to be stored thereat. In the event an etching and vaporizing method is employed, all coupling resistances are vaporized on the insulating member, then covered and the entire area subsequently coated with copper. The copper is then etched to form the desired horizontal and vertical conductors and suitable connections are provided between the coupling resistances and the desired conductors in accordance with the information to be stored.

It will be appreciated from the above description that the present invention enables the production of a fixed value storer which substantially eliminates the disadvantages present in previous storage arrangements whereby accurate and reliable read out may be achieved.

I claim as my invention:

1. A fixed value storer for binary values, employing resistance coupling between intersecting word and read lines, in which each word line comprises a single conductor and each read line comprises a pair of conductors, a coupling resistance connecting a word line and one conductor of a read line to effect storage of one binary value, and a coupling resistance connecting a word line with the other conductor of such a read line to effect storage of the other binary value.

2. A fixed value storer according to claim 1, wherein a corresponding end of each conductor of a read line is connected to voltage difference-forming means, operative during readout to produce bipolar read signals, in which the polarity is dependent upon the binary value to be read out.

3. A fixed value storer according to claim 1, wherein each word line is terminated at one end by a resistance and a corresponding end of each conductor of a read line is terminated by a resistance, the read voltage appearing on a read conductor at such resistance.

4. A fixed value storer according to claim 1, wherein each coupling resistance is disposed between adjacent word lines and between the read conductors of a read line, whereby either operative end of the resistance, in dependence upon the binary value to be stored, may be connected to the adjacent conductor of the word line, and the opposite operative end of such resistance may be connected to the particular read conductor involved of the associated read line.